(12) United States Patent
Koito

(10) Patent No.: US 11,415,827 B2
(45) Date of Patent: Aug. 16, 2022

(54) DISPLAY DEVICE AND ELECTRONIC APPARATUS INCORPORATING DISPLAY DEVICE

(71) Applicant: Japan Display Inc., Tokyo (JP)

(72) Inventor: Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/304,772

(22) Filed: Jun. 25, 2021

(65) Prior Publication Data

US 2021/0318573 A1 Oct. 14, 2021

Related U.S. Application Data

(63) Continuation of application No. PCT/JP2019/044594, filed on Nov. 13, 2019.

(30) Foreign Application Priority Data

Dec. 28, 2018 (JP) .............................. JP2018-246696

(51) Int. Cl.
| | |
|---|---|
| *G02F 1/1333* | (2006.01) |
| *G01S 17/04* | (2020.01) |
| *G02F 1/1343* | (2006.01) |
| *F21V 8/00* | (2006.01) |
| *G02F 1/1335* | (2006.01) |

(Continued)

(52) U.S. Cl.
CPC ........ *G02F 1/133388* (2021.01); *G01S 17/04* (2020.01); *G02B 6/0081* (2013.01); *G02F 1/133345* (2013.01); *G02F 1/133371* (2013.01); *G02F 1/133512* (2013.01); *G02F 1/133514* (2013.01); *G02F 1/134363* (2013.01); *G02F 1/134381* (2021.01); *H04N 5/2257* (2013.01); *G02F 1/1339* (2013.01)

(58) Field of Classification Search
None
See application file for complete search history.

(56) References Cited

U.S. PATENT DOCUMENTS

2011/0069254 A1* 3/2011 Takama .............. G02F 1/13338
349/62
2013/0063676 A1* 3/2013 Tsuchihashi ........ G02F 1/13338
349/54

(Continued)

FOREIGN PATENT DOCUMENTS

| JP | 2010015015 A | * | 1/2010 |
|---|---|---|---|
| JP | 2010019938 A | * | 1/2010 |

(Continued)

*Primary Examiner* — Shan Liu
(74) *Attorney, Agent, or Firm* — Maier & Maier, PLLC

(57) ABSTRACT

According to one embodiment, an electronic apparatus includes a liquid crystal panel including a liquid crystal layer, a first transparent electrode, an insulating film covering the first transparent electrode, a second transparent electrode disposed between the insulating film and the liquid crystal layer, and a modulation area in which the first transparent electrode and the second transparent are arranged alternately, a projection element overlapping the liquid crystal panel, and projecting linearly polarized infrared light toward the modulation area, and a detection element overlapping the liquid crystal panel, and detecting infrared light via the liquid crystal panel.

18 Claims, 10 Drawing Sheets

(51) Int. Cl.
    *H04N 5/225*     (2006.01)
    *G02F 1/1339*     (2006.01)

(56) References Cited

U.S. PATENT DOCUMENTS

| | | | |
|---|---|---|---|
| 2014/0055692 A1* | 2/2014 | Kroll | G02F 1/1347 |
| | | | 349/15 |
| 2016/0161664 A1* | 6/2016 | Ishida | G02B 6/0061 |
| | | | 359/230 |
| 2016/0223863 A1* | 8/2016 | Mizunuma | G02F 1/133617 |
| 2017/0053592 A1 | 2/2017 | Shin et al. | |
| 2019/0019025 A1* | 1/2019 | Yamazaki | G06F 21/32 |
| 2020/0278576 A1* | 9/2020 | Tan | G02F 1/133504 |
| 2020/0301165 A1* | 9/2020 | Fattal | G02B 6/0036 |

FOREIGN PATENT DOCUMENTS

| | | |
|---|---|---|
| JP | 2016-040520 A | 3/2016 |
| JP | 2017-040908 A | 2/2017 |

\* cited by examiner

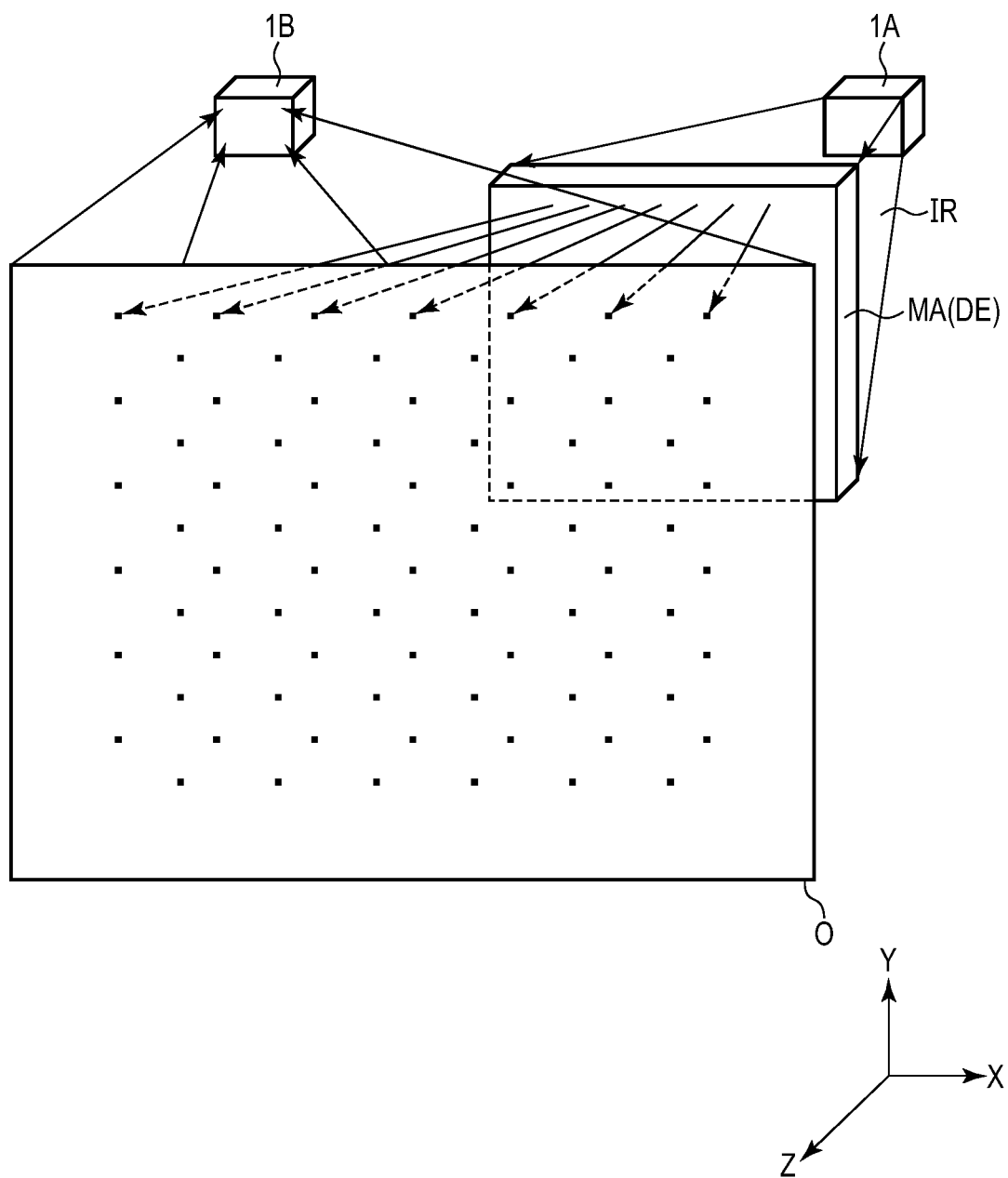
F I G. 7

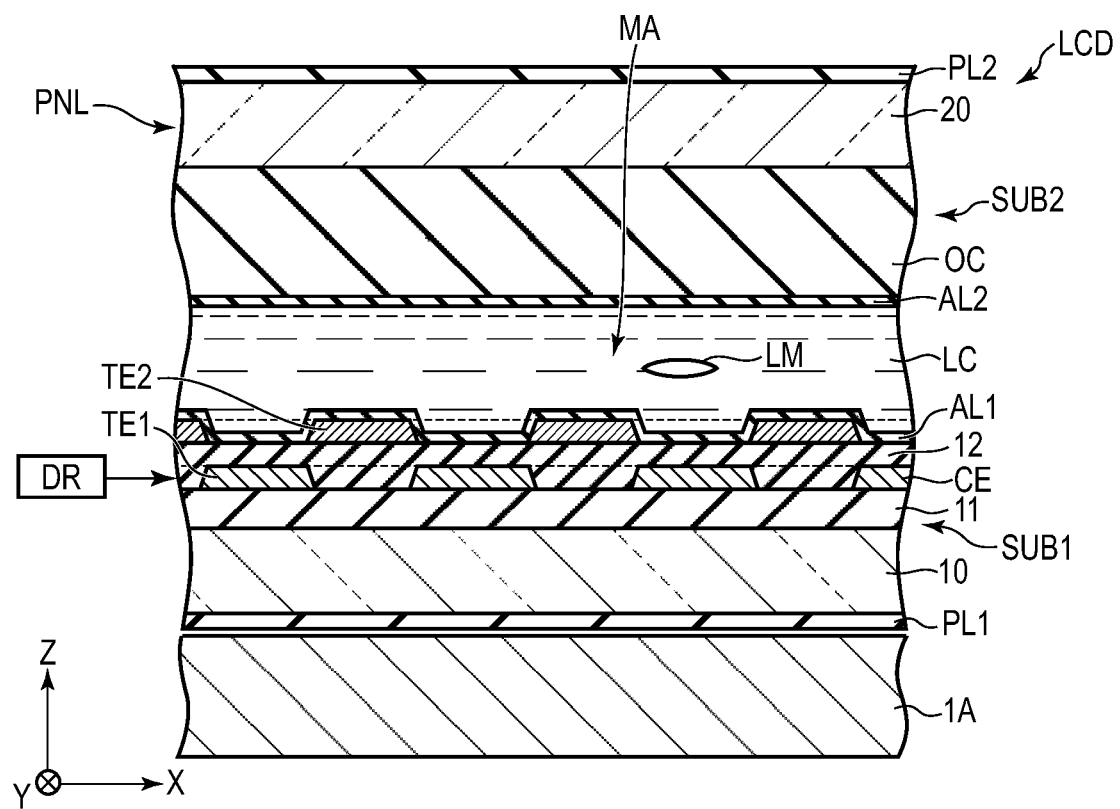
F I G. 10

DISPLAY DEVICE AND ELECTRONIC APPARATUS INCORPORATING DISPLAY DEVICE

CROSS-REFERENCE TO RELATED APPLICATIONS

This application is a Continuation Application of PCT Application No. PCT/JP2019/044594, filed Nov. 13, 2019 and based upon and claiming the benefit of priority from Japanese Patent Application No. 2018-246696, filed Dec. 28, 2018, the entire contents of all of which are incorporated herein by reference.

FIELD

Embodiments described herein relate generally to a display device and an electronic apparatus incorporating the display device.

BACKGROUND

Recently, electronic apparatuses such as smartphones comprising a display part and a camera on the same surface side have been widely put into practical use. In this electronic apparatus, the camera is disposed outside the display part, and it has been increasingly required to expand the display part while securing a space for installing the camera and the like.

In the meantime, object detection devices which detect an object by projecting dot pattern laser light onto a target area and image capturing the target area have been proposed.

BRIEF DESCRIPTION OF THE DRAWINGS

FIG. 7 is an illustration schematically showing a state where infrared light IR is projected onto an object O.

FIG. 10 is a cross-sectional view showing the second configuration example of the liquid crystal element LCD including the modulation area MA shown in FIG. 2.

DETAILED DESCRIPTION

Figure 1:
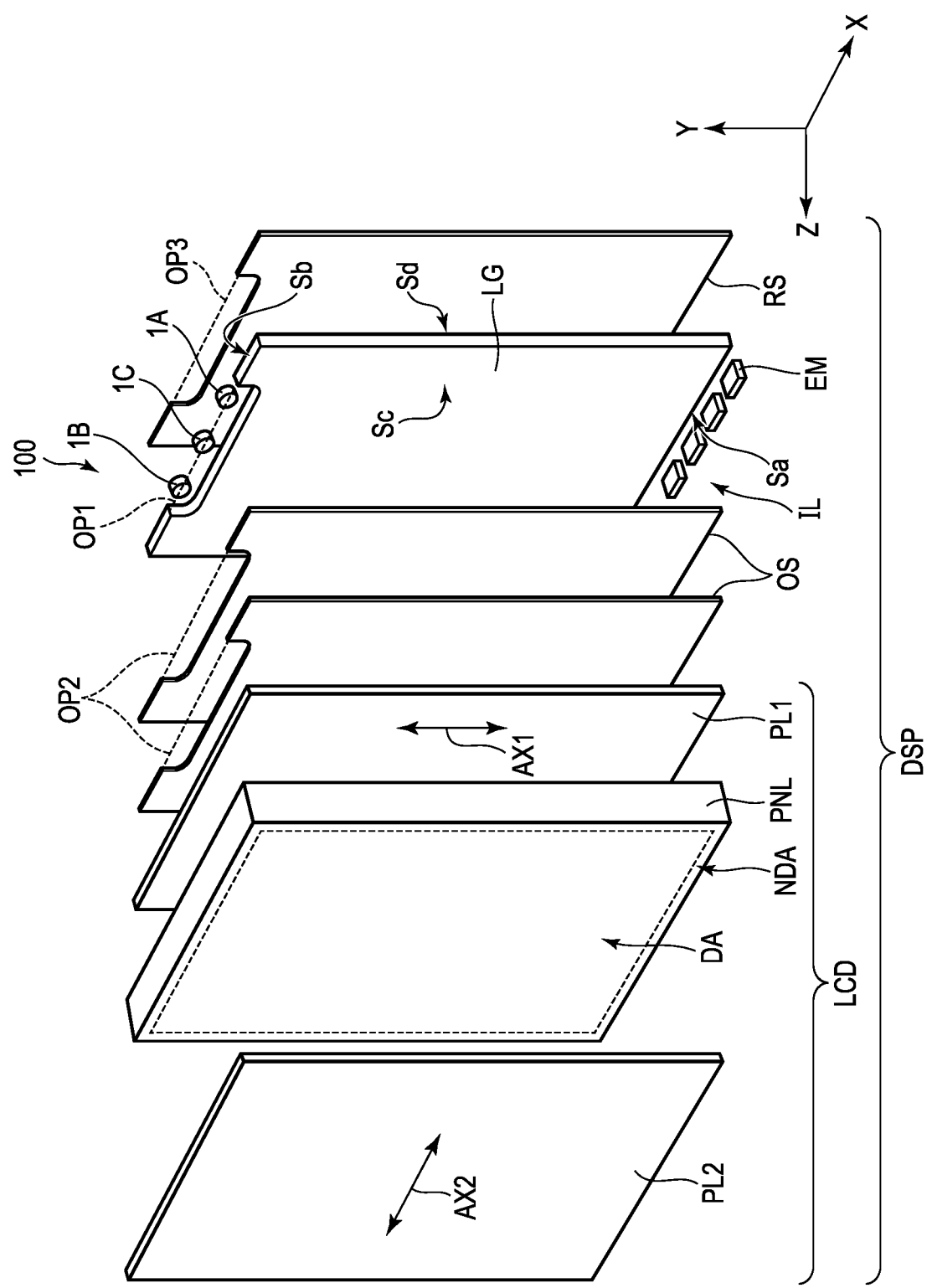
FIG. 1 is an exploded perspective view showing a configuration example of a display device DSP according to the present embodiment.

In general, according to one embodiment, there is provided an electronic apparatus comprising: a liquid crystal panel comprising a liquid crystal layer, a first transparent electrode, an insulating film covering the first transparent electrode, a second transparent electrode disposed between the insulating film and the liquid crystal layer, and a modulation area in which the first transparent electrode and the second transparent are arranged alternately; a projection element overlapping the liquid crystal panel, and projecting linearly polarized infrared light toward the modulation area; and a detection element overlapping the liquid crystal panel, and detecting infrared light via the liquid crystal panel.

According to another embodiment, there is provided a display device comprising: a first substrate comprising a first insulating substrate, a first transparent electrode and a second transparent electrode disposed on the first insulating substrate, a common electrode and a pixel electrode disposed on the first insulating substrate, and an insulating film disposed between the first transparent electrode and the second transparent electrode and between the common electrode and the pixel electrode; a second substrate comprising a second insulating substrate; and a liquid crystal layer disposed between the first substrate and the second substrate. The liquid crystal layer forms a diffraction element overlapping the first transparent electrode and the second transparent electrode.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference signs, and detailed descriptions thereof which are considered redundant are omitted unless necessary.

FIG. 1 is an exploded perspective view showing a configuration example of a display device DSP according to the present embodiment. A first direction X, a second direction Y and a third direction Z are orthogonal to one another in one example, but may intersect at an angle other than 90 degrees. The first direction X and the second direction Y correspond to directions parallel to the main surface of a substrate constituting the display device DSP, and the third direction Z corresponds to the thickness direction of the display device DSP.

The display device DSP comprises a first polarizer PL1 and a second polarizer PL2, a liquid crystal panel PNL, optical sheets OS, a light guide LG, light sources EM and a reflective sheet RS. The reflective sheet RS, the light guide LG, the optical sheets OS, the first polarizer PL1, the liquid crystal panel PNL and the second polarizer PL2 are arranged in this order along the third direction Z. The light sources EM are arranged at intervals along the first direction X. The first polarizer PL1, the second polarizer PL2 and the liquid crystal panel PNL constitute a liquid crystal element LCD comprising an optical switch function for light traveling along the third direction Z. This liquid crystal element LCD performs a function of transmitting light or blocking light for each area in an X-Y plane defined by the first direction X and the second direction Y.

The liquid crystal panel PNL is formed in, for example, a flat plate shape parallel to the X-Y plane. The liquid crystal panel PNL is disposed between the first polarizer PL1 and the second polarizer PL2. The liquid crystal panel PNL comprises a display portion DA for displaying an image, and a frame-shaped non-display portion NDA surrounding the display portion DA. The display portion DA is a substantially quadrangular area including no notch, and four corners thereof may be rounded. The description of the detailed configuration of the liquid crystal panel PNL is omitted here, but the liquid crystal panel PNL may comprise a configuration corresponding to any of a display mode using a lateral electric field along the main surface of a substrate, a display mode using a longitudinal electric field along the normal to the main surface of a substrate, a display mode using an inclined electric field inclined in an oblique direction with respect to the main surface of a substrate, and a display mode using an arbitrary combination of the lateral electric field, the longitudinal electric field and the inclined electric field described above. The main surface of the substrate here is a surface parallel to the X-Y plane.

The first polarizer PL1 and the second polarizer PL2 overlap at least the display portion DA with respect to the liquid crystal panel PNL. In one example, an absorption axis AX1 of the first polarizer PL1 and an absorption axis AX2 of the second polarizer PL2 are orthogonal to each other in the X-Y plane.

An illumination device IL illuminates the liquid crystal panel PNL from the back surface side. The illumination device IL is composed of, for example, the light sources EM, the light guide LG, the optical sheets OS and the reflective sheet RS.

The light guide LG has a side surface Sa opposed to the light sources EM, a side surface Sb on the opposite side to the side surface Sa, a main surface Sc opposed to the liquid crystal panel PNL, a main surface Sd on the opposite side to the main surface Sc, and a first opening OP1. The first opening OP1 is provided on the opposite side to the side surface Sa, but is not particularly limited, and may be provided on a side surface orthogonal to the side surface Sa. In the illustrated example, the first opening OP1 corresponds to a concave portion or notch recessed from the side surface Sb toward the side surface Sa. It should be noted that the first opening OP1 may be a through hole penetrating the light guide LG in the third direction Z.

The optical sheets OS are disposed between the light guide LG and the liquid crystal panel PNL, and are opposed to the main surface Sc. The optical sheets OS each have a second opening OP2 overlapping the first opening OP1. The optical sheets OS each are, for example, a prism sheet or a diffusion sheet.

The reflective sheet RS is opposed to the main surface Sd. That is, the light guide LG is disposed between the reflective sheet RS and the optical sheets OS. The reflective sheet RS has a third opening OP3 overlapping the first opening OP1. The third opening OP3, the first opening OP1 and the second opening OP2 are arranged in this order along the third direction Z, and are provided on the same straight line. The reflective sheet RS may be fixed to a frame, for example. In that case, an opening overlapping the first opening OP1 may also be provided in the frame.

The light sources EM each are, for example, a light-emitting diode (LED), and each emit white illumination light. The illumination light emitted from the light sources EM enters from the side surface Sa, and travels inside the light guide LG. Then, the illumination light guided by the light guide LG is emitted from the main surface Sc toward the liquid crystal panel PNL, and illuminates the liquid crystal panel PNL. The liquid crystal panel PNL, the first polarizer PL1 and the second polarizer PL2 selectively transmit the illumination light and thereby display an image in the display portion DA.

An electronic apparatus 100 incorporating this display device DSP comprises a projection element 1A, a detection element 1B, a camera 1C for visible light, and the like. For example, the detection element 1B, the camera 1C and the projection element 1A are arranged in this order at intervals along the first direction X, and are disposed overlapping the first to third openings OP1 to OP3 in the third direction Z. The liquid crystal panel PNL, the first polarizer PL1 and the second polarizer PL2 overlap the first to third openings OP1 to OP3 and also overlap the projection element 1A, the detection element 1B and the camera 1C in the third direction Z. In addition, the projection element 1A, the detection element 1B and the camera 1C overlap the display portion DA of the liquid crystal panel PNL in the third direction Z.

The projection element 1A projects linearly polarized infrared light toward the liquid crystal panel PNL, the first polarizer PL1 and the second polarizer PL2. The projection element 1A radiates infrared light having a peak wavelength in a range of, for example, 900 nm to 1000 nm. The infrared light emitted from the projection element 1A via the liquid crystal element LCD forms a pattern of dots distributed in the X-Y plane, and is projected onto an objected to be detected.

The detection element 1B detects the infrared light transmitted via the liquid crystal panel PNL, the first polarizer PL1 and the second polarizer PL2 (that is, the infrared light dot pattern reflected from the objected to be detected). The detection result by the detection element 1B can be used for, for example, authentication of the objected to be detected or the like.

The camera 1 comprises an image sensor (imaging element) which receives light via the liquid crystal panel PNL, the first polarizer PL1 and the second polarizer PL2. This camera 1C receives visible light (light in a range of, for example, 400 nm to 700 nm) transmitted via the liquid crystal panel PNL, the first polarizer PL1 and the second polarizer PL2. When the absorption axis AX1 of the first polarizer PL1 and the absorption axis AX2 of the second polarizer PL2 are orthogonal to each other, and when the wavelength of light transmitted through a liquid crystal layer LC of the liquid crystal element LCD is $\lambda$ and the retardation of the liquid crystal layer LC corresponds to almost zero or $\lambda$, the transmittance of the liquid crystal element LCD is minimized. Therefore, during the image capturing by the camera 1C, the retardation of the liquid crystal layer LC is set to greater than zero but less than $\lambda$. When the retardation is about $\lambda/2$, the transmittance of the liquid crystal element LCD is maximized.

The first polarizer PL1 and the second polarizer PL2 employed in the present embodiment transmit infrared light in a range of 900 nm to 1000 nm regardless of the polarization state. That is, the infrared light projected from the projection element 1A passes through the first polarizer PL1 and the second polarizer PL2 and reaches the objected to be detected. In addition, the infrared light reflected by the objected to be detected is transmitted through the first polarizer PL1 and the second polarizer PL2 and is detected by the detection element 1B. When the first polarizer PL1 and the second polarizer PL2 have an infrared light absorption property, it is preferable that at least one of the first polarizer PL1 and the second polarizer PL2 should have an opening overlapping the projection element 1A and the detection element 1B. When one of the first polarizer PL1 and the second polarizer PL2 has an opening, it is preferable that the opening should be provided in the first polarizer PL1 and a step due to the opening should not be formed in the second polarizer PL2.

Figure 2:
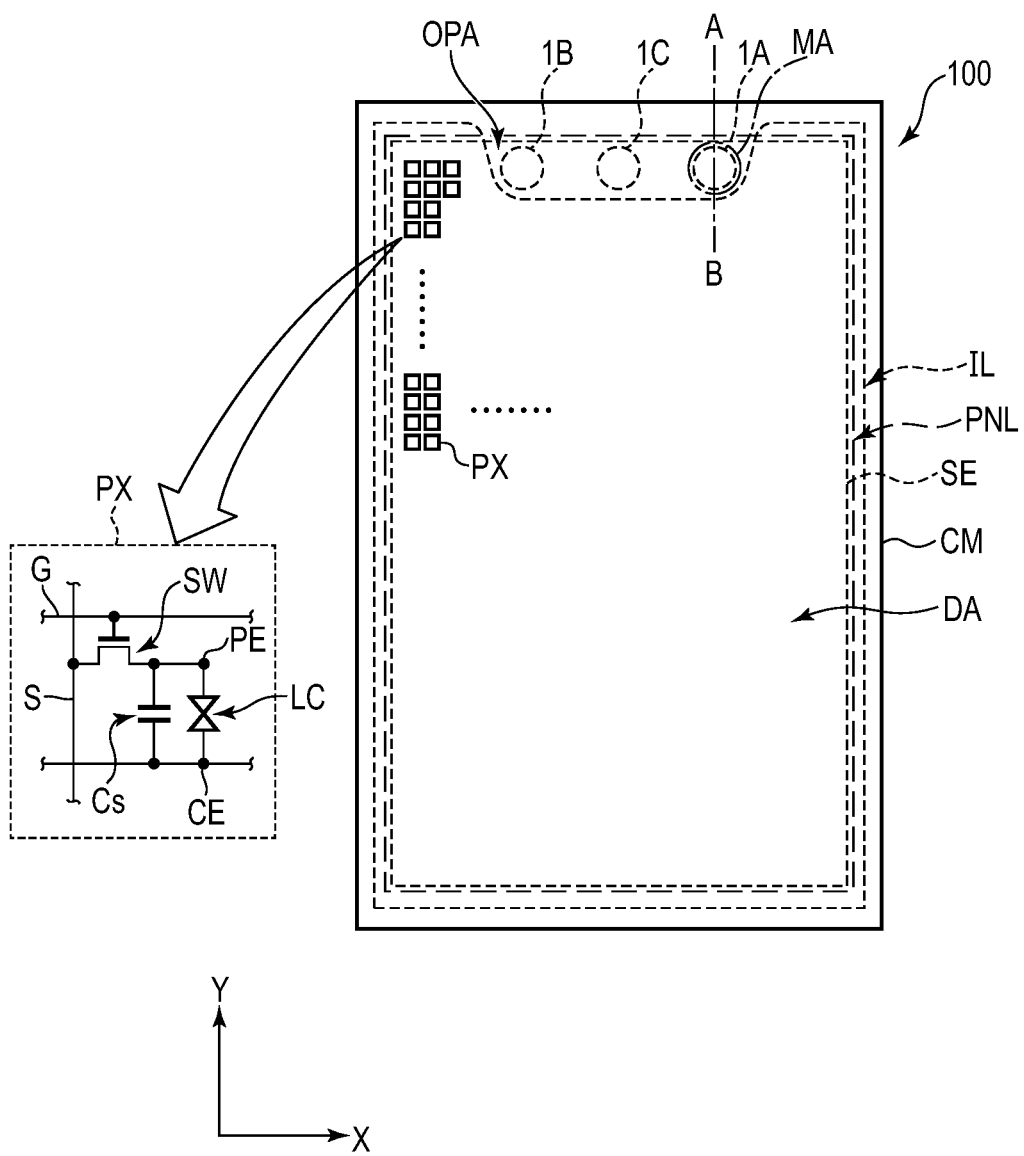
FIG. 2 is a plan view showing a configuration example of an electronic apparatus 100.

FIG. 2 is a plan view showing a configuration example of the electronic apparatus 100. The illumination device IL has an opening OPA. The first to third openings OP1 to OP3 shown in FIG. 1 are formed corresponding to the opening OPA. The projection element 1A, the detection element 1B and the camera 1C are disposed in the opening OPA. The opening OPA of the illumination device IL or the first to third openings OP1 to OP3 overlap the display portion DA in planar view.

The liquid crystal panel PNL comprises pixels PX arranged in a matrix in the first direction X and the second direction Y in the display portion DA. Each pixel PX has the same circuit configuration. As shown enlarged in FIG. 2, each pixel PX comprises a switching element SW, a pixel electrode PE, a common electrode CE, a liquid crystal layer LC and the like. The switching element SW is composed of, for example, a thin-film transistor (TFT), and is electrically connected to a scanning line G and a signal line S. The pixel electrode PE is electrically connected to the switching element SW. Each pixel electrode PE is opposed to the common electrode CE. The liquid crystal layer LC is driven by an electric field generated between the pixel electrode PE and the common electrode CE. A capacitance Cs is formed, for example, between an electrode having the same potential as the common electrode CE and an electrode having the same potential as the pixel electrode PE.

The liquid crystal panel PNL overlaps the illumination device IL. In addition, the liquid crystal panel PNL overlaps the projection element 1A, the detection element 1B and the camera 1C. In planar view, the projection element 1A, the detection element 1B and the camera 1C is disposed on the inside surrounded by a sealant SE of the liquid crystal panel PNL. The liquid crystal panel PNL comprises a modulation area MA overlapping the projection element 1A. The modulation area MA will be described later in detail, but the modulation area MA has a different configuration from the pixel PX. In the liquid crystal panel PNL, an area overlapping the detection element 1B and the camera 1C may have the same configuration as the pixel PX, may have the same configuration as the modulation area MA, or may have a different configuration from the pixel PX and the modulation area MA.

A cover member CM is transparent, and is a glass substrate or a resin substrate. The cover member CM overlaps the liquid crystal panel PNL.

Figure 3:
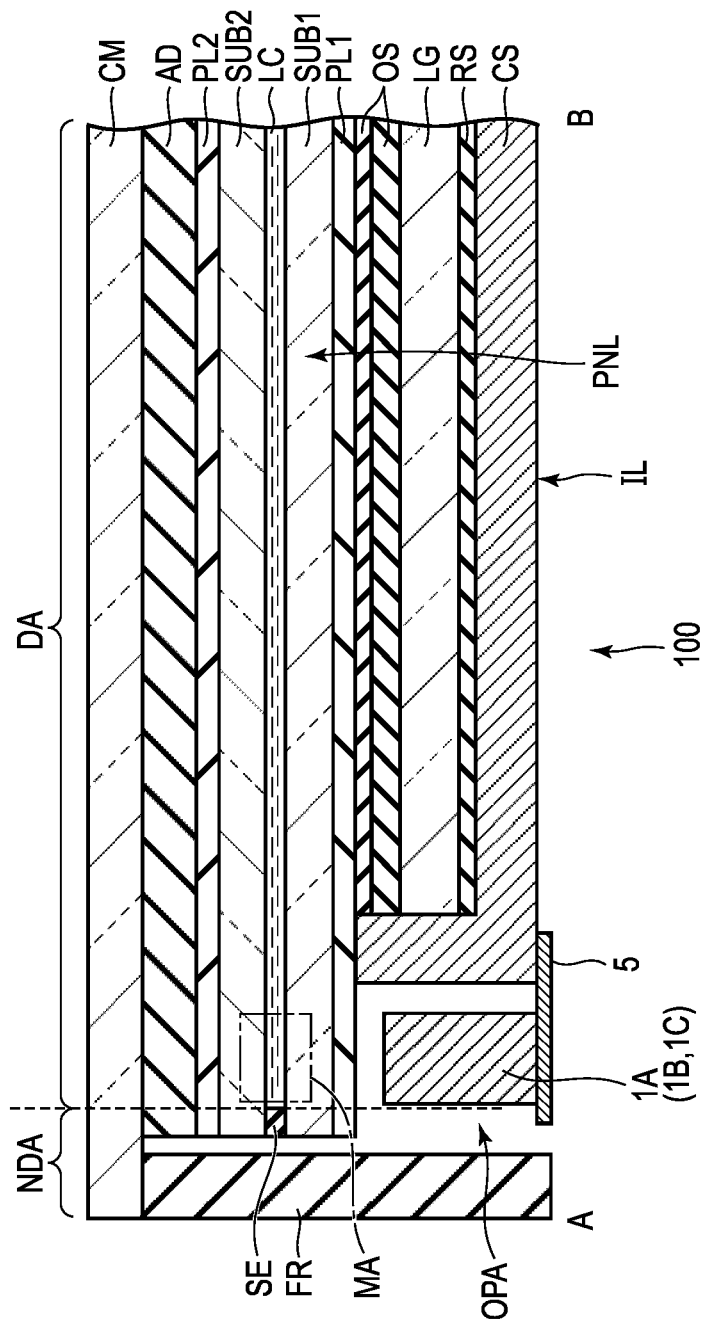
FIG. 3 is a cross-sectional view along line A-B including a projection element 1A of the electronic apparatus 100 shown in FIG. 2.

FIG. 3 is a cross-sectional view along line A-B including the projection element 1A of the electronic apparatus 100 shown in FIG. 2. The liquid crystal panel PNL comprises a first substrate SUB1, a second substrate SUB2, a liquid crystal layer LC and a sealant SE. The liquid crystal layer LC is disposed between the first substrate SUB1 and the second substrate SUB2. The sealant SE is located in the non-display portion NDA, and bonds the first substrate SUB1 and the second substrate SUB2 together and seals in the liquid crystal layer LC.

The first polarizer PL1 is bonded to the first substrate SUB1. The second polarizer PL2 is bonded to the second substrate SUB2. The first polarizer PL1 and the second polarizer PL2 are arranged over the display portion DA and the non-display portion NDA. It should be noted that the first polarizer PL1 and the second polarizer PL2 may comprise a retarder, a scattering layer, an antireflective layer and the like as needed.

The illumination device IL is disposed on the back surface side of the first substrate SUB1. In the illumination device IL, the optical sheets OS, the light guide LG, the reflective sheet RS, and the unillustrated light sources EM are accommodated in a case CS. This illumination device IL is bonded to the first polarizer PL1 by an unillustrated double-faced tape or the like.

The cover member CM is bonded to the second polarizer PL2 by a transparent adhesive resin AD. The cover member CM is fixed to a frame FR of the electronic apparatus 100.

In the illustrated cross-sectional view, the opening OPA corresponds to a space between the frame FR and the case CS of the illumination device IL. This space is located below the liquid crystal panel PNL. The projection element 1A is disposed between the frame FR and the case CS. The unillustrated detection element 1B and camera 1C are also disposed between the frame FR and the case CS. The projection element 1A is electrically connected to a wiring board 5. The detection element 1B and the camera 1C may be electrically connected to the same wiring board 5 as the projection element 1A or may be electrically connected to a wiring board different from the wiring board 5.

According to the present embodiment, the projection element 1A, the projection element 1B and the camera 1C overlap the liquid crystal panel PNL. In addition, according to the present embodiment, the projection element 1A, the detection element 1B and the camera 1C overlap the display portion DA of the liquid crystal panel PNL. Therefore, the display portion DA can be expanded.

Furthermore, it is not necessary to provide a space for installing the projection element 1A and the like in the non-display portion NDA. Therefore, the frame width of the non-display portion NDA can be reduced as compared with when the projection element 1A and the like overlap the non-display portion NDA.

Figure 4:
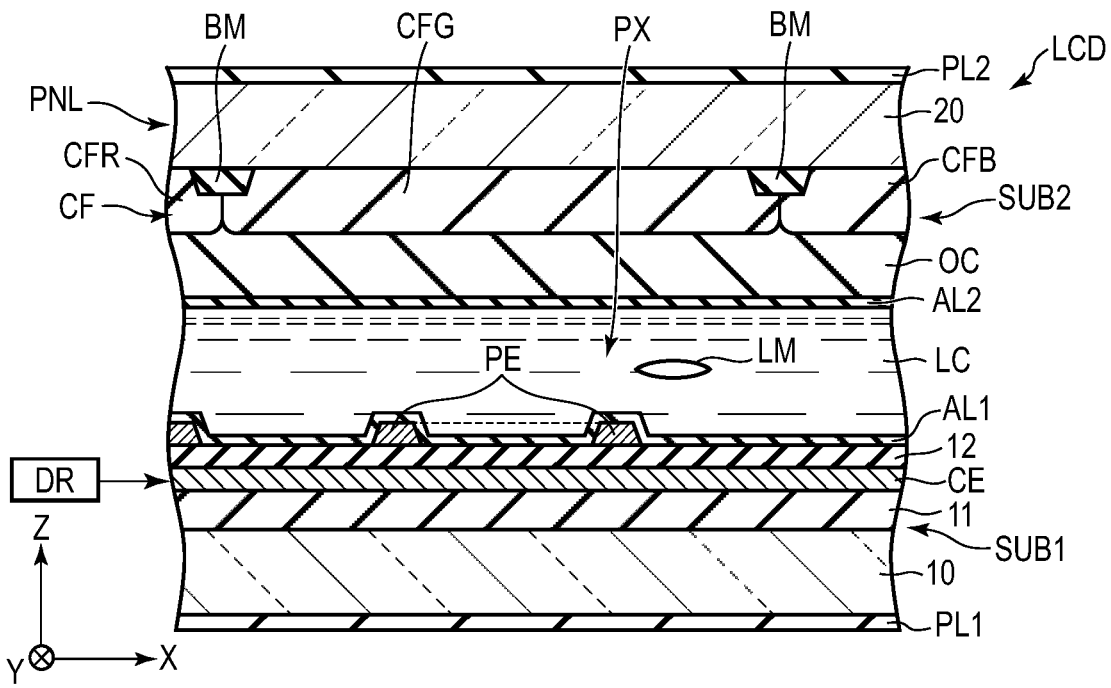
FIG. 4 is a cross-sectional view of a liquid crystal element LCD including a pixel PX shown in FIG. 2.

FIG. 4 is a cross-sectional view of the liquid crystal element LCD including the pixel PX shown in FIG. 2. The liquid crystal element LCD described here comprises the liquid crystal panel PNL corresponding to the display mode using the lateral electric field between the first polarizer PL1 and the second polarizer PL2.

The first substrate SUB1 comprises a first insulating substrate 10, insulating films 11 and 12, the common electrode CE, the pixel electrode PE, and an alignment film AL1. The scanning line, the signal line and the switching element shown in FIG. 2 are disposed, for example, between the first insulating substrate 10 and the common electrode CE. The common electrode CE is disposed on the insulating film 11, and is covered with the insulating film 12. The pixel electrode PE is disposed on the insulating film 12, and is covered with the alignment film AL1. The pixel electrode PE overlaps the common electrode CE via the insulating film 12. The common electrode CE and the pixel electrode PE are formed of a transparent conductive material such as indium tin oxide (ITO) or indium zinc oxide (IZO). The pixel electrode PE comprises strip electrodes. The common electrode CE is a plate-shaped electrode disposed in common over the pixels PX. Although not described in detail, the insulating film 11 includes an inorganic insulating film and an organic insulating film. The insulating film 12 is, for example, an inorganic insulating film of silicon nitride or the like.

The second substrate SUB2 comprises a second insulating substrate 20, a color filter layer CF, a light-shielding layer BM, a transparent layer OC and an alignment film AL2. The color filter layer CF comprises a red color filter CFR arranged in a red pixel, a green color filter CFG arranged in a green pixel, and a blue color filter CFB arranged in a blue pixel. The green color filter CFG is opposed to the pixel electrode PE. The red color filter CFR and the blue color filter CFB are also opposed to unillustrated other pixel electrodes PE, respectively. The light-shielding layer BM is disposed between adjacent pixels or between adjacent color filters. The transparent layer OC covers the color filer layer CF and the light-shielding layer BM. The transparent layer OC is, for example, a transparent organic insulating film. The first insulating substrate 10 and the second insulating substrate 20 each are a transparent substrate such as a glass substrate or a flexible resin substrate. The alignment films AL1 and AL2 are in contact with the liquid crystal layer LC.

A driver DR which drives the liquid crystal element LCD includes, for example, a scanning line drive circuit electrically connected to the scanning line G and a signal line drive circuit electrically connected to the signal line S shown in FIG. 2. For each pixel PX of the display portion DA, the driver DR outputs a signal necessary for displaying an image, and controls the transmittance of the liquid crystal element LCD. The transmittance of the liquid crystal element LCD is controlled according to the magnitude of voltage applied to the liquid crystal layer LC.

In the pixel PX, for example, in an off state where voltage is not applied to the liquid crystal layer LC, liquid crystal molecules LM contained in the liquid crystal layer LC are initially aligned in a predetermined direction between the alignment films AL1 and AL2. In the off state, light guided from the light source EM shown in FIG. 1 to the pixel PX is absorbed by the first polarizer PL1 and the second polarizer PL2. Therefore, the liquid crystal element LCD displays black in the pixel PX in the off state.

On the other hand, in an on state where voltage is applied to the liquid crystal layer LC, the liquid crystal molecules LM are aligned in a direction different from the initial alignment direction by an electric field formed between the pixel electrode PE and the common electrode CE, and the alignment direction is controlled by the electric field. In the on state, a part of light guided to the pixel PX is transmitted through the first polarizer PL1 and the second polarizer PL2. Therefore, the liquid crystal element LCD displays a color corresponding to the color filter layer CF in the pixel PX in the on state.

The above example corresponds to a so-called normally black mode in which black is displayed in the off state. However, a normally white mode in which black is displayed in the on state (white is displayed in the off state) may be applied.

The pixel electrode PE and the common electrode CE do not overlap any of the projection element 1A, the detection element 1B and the camera 1C.

Figure 5:
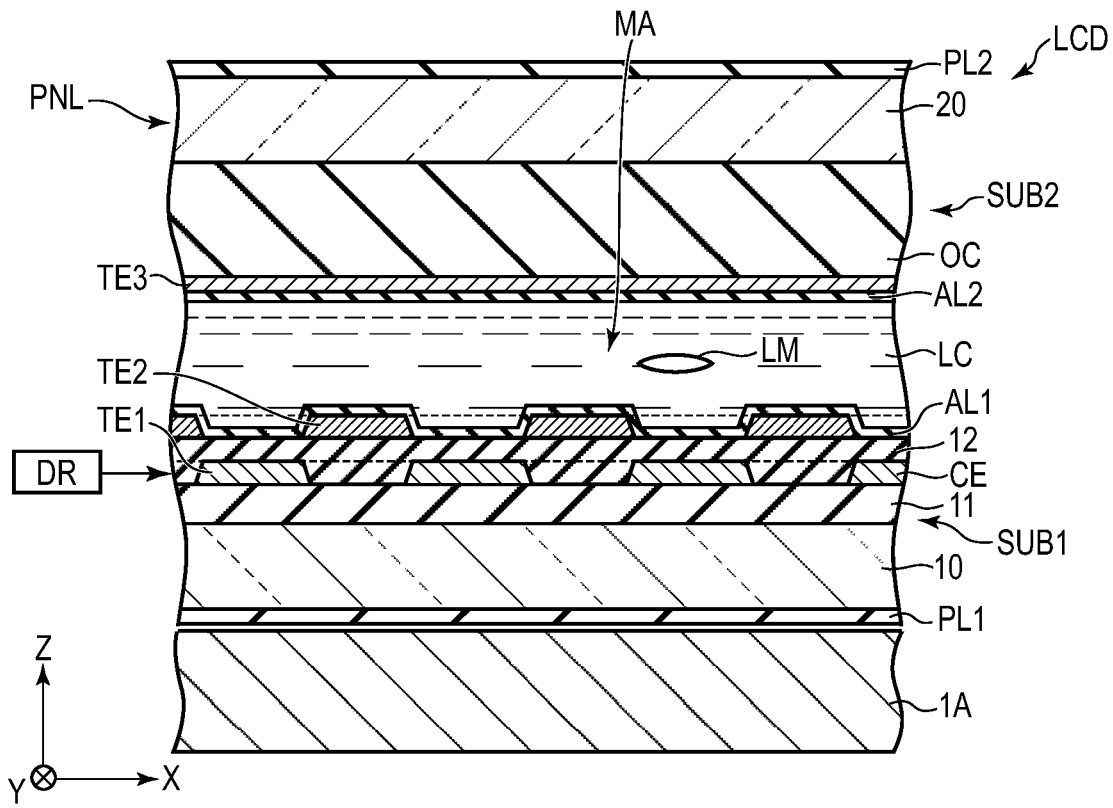
FIG. 5 is a cross-sectional view showing the first configuration example of the liquid crystal element LCD including a modulation area MA shown in FIG. 2.

FIG. 5 is a cross-sectional view showing the first configuration example of the liquid crystal element LCD including the modulation area MA shown in FIG. 2. In the modulation area MA, the first substrate SUB1 comprises a first transparent electrode TE1 and a second transparent electrode TE2. The insulating films 11 and 12 extend in the modulation area MA. The first transparent electrode TE1 is disposed on the insulating film 11, and is covered with the second insulating film 12. That is, the first transparent electrode TE1 is disposed in the same layer as the common electrode CE shown in FIG. 4. In addition, the first transparent electrode TE1 is formed of the same material as the common electrode CE. The second transparent electrode TE2 is disposed between the insulating film 12 and the liquid crystal layer LC, and is covered with the alignment film AL. That is, the second transparent electrode TE2 is disposed in the same layer as the pixel electrode PE shown in FIG. 4. In addition, the second transparent electrode TE2 is formed of the same material as the pixel electrode PE. In the illustrated example, the first transparent electrode TE1 and the second transparent electrode TE2 are arranged alternately along the first direction X. It should be noted that the first transparent electrode TE1 and the second transparent electrode TE2 may be arranged alternately along the second direction Y or may be arranged alternately along both the first direction X and the second direction Y. It is preferable that the edge of the second transparent electrode TE2 should be located directly above the first transparent electrode TE1. That is, it is preferable that no gap should be formed between the first transparent electrode TE1 and the second transparent electrode TE2 when the first substrate SUB2 is planarly viewed. Directly below the second transparent electrode TE2, the insulating film 12 is in contact with the insulating film 11 between the adjacent first transparent electrodes TE1. Directly above the first transparent electrode TE1, the alignment film AL1 is in contact with the insulating film 12 between the adjacent second transparent electrodes TE2.

The second substrate SUB2 comprises a third transparent electrode TE3. In addition, in the modulation area MA, the second substrate SUB2 does not comprise the color filter layer CF or the light-shielding layer BM. In the illustrated example, the third transparent electrode TE3 is disposed between the transparent layer OC and the alignment film AL2. The transparent layer OC is in contact with the second insulating substrate 20. It should be noted that the third transparent electrode TE3 may be disposed between the second insulating substrate 20 and the transparent layer OC. This third transparent electrode TE3 is disposed directly above the first transparent electrode TE1 and the second transparent electrode TE2. That is, the liquid crystal layer LC is disposed between the first transparent electrode TE1 and the third transparent electrode TE3 and between the second transparent electrode TE2 and the third transparent electrode TE3. As described above, in the modulation area MA, the first transparent electrode TE1, the second transparent electrode TE2 and the third transparent electrode TE3 overlap the projection element 1A.

The modulation area MA is controlled by the driver DR as with the pixel PX. A control example of the modulation area MA will be described below.

Figure 6B:
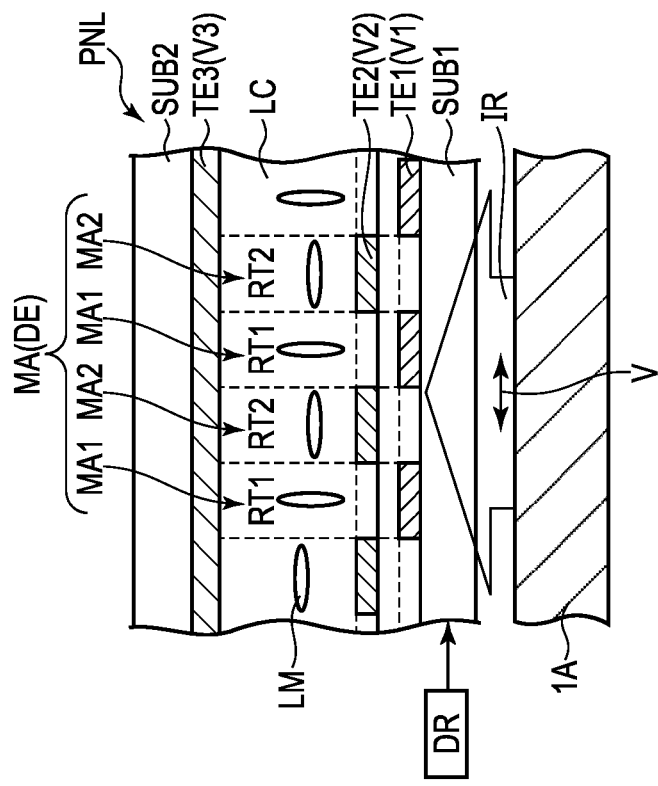
FIG. 6B is an illustration for explaining a control example of the modulation area MA, and is an illustration showing the modulation area MA in an on state.
Figure 6A:
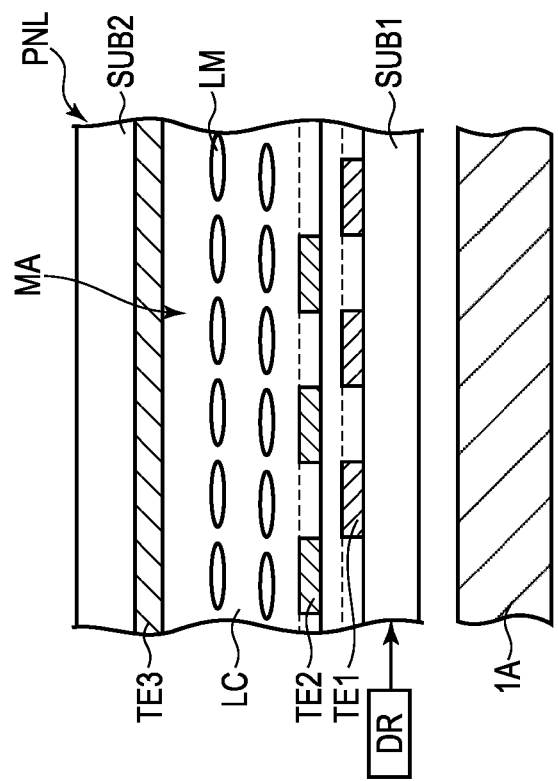
FIG. 6A is an illustration for explaining a control example of the modulation area MA, and is an illustration showing the modulation area MA in an off state.

FIGS. 6A and 6B each are an illustration for explaining a control example of the modulation area MA. Here, the configurations of the first substrate SUB1 and the second substrate SUB2 are shown simplified. FIG. 6A shows the modulation area MA in an off state, and FIG. 6B shows the modulation area MA in an on state. For example, the modulation area MA is set to an off state when the infrared light IR is not projected from the projection element 1A, and the modulation area MA is set to an on state when the infrared light IR is projected from the projection element 1A.

In the off state, the driver DR does not apply voltage to the first transparent electrode TE1, the second transparent electrode TE2 or the third transparent electrode TE3 (or applies the same potential to all the transparent electrodes). Therefore, voltage is not applied to the liquid crystal layer LC, and the liquid crystal molecules LM contained in the liquid crystal layer LC are initially aligned in a predetermined direction between the alignment films AL1 and AL2. In the liquid crystal layer LC in the off state, the retardation between the first transparent electrode TE1 and the third transparent electrode TE3 is equal to the retardation between the second transparent electrode TE2 and the third transparent electrode TE3.

In the on state, the driver DR applies a first voltage V1 to the first transparent electrode TE1, and applies a second voltage V2 different from the first voltage V1 to the second transparent electrode TE2. In addition, the driver DR applies a third voltage V3 to the third transparent electrode TE3. The third voltage V3 may be a voltage different from both the first voltage V1 and the second voltage V2 or may be a voltage equal to either the first voltage V1 or the second voltage V2. In one example, the first voltage V1 is 5 V, and the second voltage V2 and the third voltage V3 are 0 V. In this case, while an electric field is formed in the liquid crystal layer LC between the first transparent electrode TE1 and the third transparent electrode TE3, almost no electric field is formed in the liquid crystal layer LC between the second transparent electrode TE2 and the third transparent electrode TE3. It should be noted that an electric field (fringe electric field) spreading over the liquid crystal layer LC is formed between the first transparent electrode TE1 and the second transparent electrode TE2.

Therefore, in the liquid crystal layer LC between the second transparent electrode TE2 and the third transparent electrode TE3, the liquid crystal molecules LM are in the initial alignment state as in the off state. In addition, in the liquid crystal layer LC between the first transparent electrode TE1 and the third transparent electrode TE3, the liquid crystal molecules LM are aligned such that major axes thereof are along the electric field. In the illustrated example, the liquid crystal layer LC is a positive type, and the liquid crystal molecules LM are aligned almost perpendicular to the first substrate SUB1 and the second substrate SUB2.

The linearly polarized infrared light IR projected from the projection element 1A toward the modulation area MA is modulated by the retardation of the liquid crystal layer LC when transmitted through the liquid crystal layer LC. In the illustrated example, a vibration direction V of the infrared light IR is almost parallel to the major axes of the liquid crystal molecules LM in the initial alignment state. For example, the liquid crystal layer LC forms a first area MA1 having a first retardation RT1 between the first transparent electrode TE1 and the third transparent electrode TE3, and forms a second area MA2 having a second retardation RT2 between the second transparent electrode TE2 and the third transparent electrode TE3. For the linearly polarized infrared light IR, the first retardation RT1 is smaller than the second retardation RT2. These first area MA1 and second area MA2 are arranged alternately along the first direction X. It should be noted that, when the first transparent electrode TE1 and the second transparent electrode TE2 are arranged alternately along the second direction Y, the first area MA1 and the second area MA2 are arranged alternately along the second direction Y. The modulation area MA comprising these first area MA1 and second area MA2 forms a diffraction element DE which modulates phase of the transmitted infrared light IR.

When visible light enters the modulation area MA in the off state, black is displayed as in the pixel PX in the off state described with reference to FIG. 4. In addition, when visible light enters the modulation area MA in the on state, white or gray is displayed as in the pixel PX in the on state described with reference to FIG. 4.

FIG. 7 is an illustration schematically showing a state where infrared light IR is projected onto an object O. The projection element 1A projects the infrared light IR toward the modulation area MA or the diffraction element DE shown in FIGS. 6A and 6B. The modulation area MA diffracts the transmitted infrared light IR, and forms a pattern of dots. The pattern of dots is distributed in the X-Y plane. The pattern of dots is projected onto the object O. The detection element 1B detects the infrared light dot pattern reflected from the object O. The illustrations of the liquid crystal element LCD and the like interposed between the detection element 1B and the object O are omitted here.

According to the first configuration example, the liquid crystal panel PNL overlapping the projection element 1A incorporates the diffraction element DE which diffracts the linearly polarized infrared light IR projected from the projection element 1A. Therefore, as compared with when a projection element incorporating a diffraction element is applied, the cost of the projection element 1A can be reduced, and the thickness of the projection element 1A can be reduced. In addition, as described above, the projection element 1A and the detection element 1B overlap the display portion DA. Therefore, the display portion DA can be expanded, and the frame width of the non-display portion NDA can be reduced.

Figure 8:
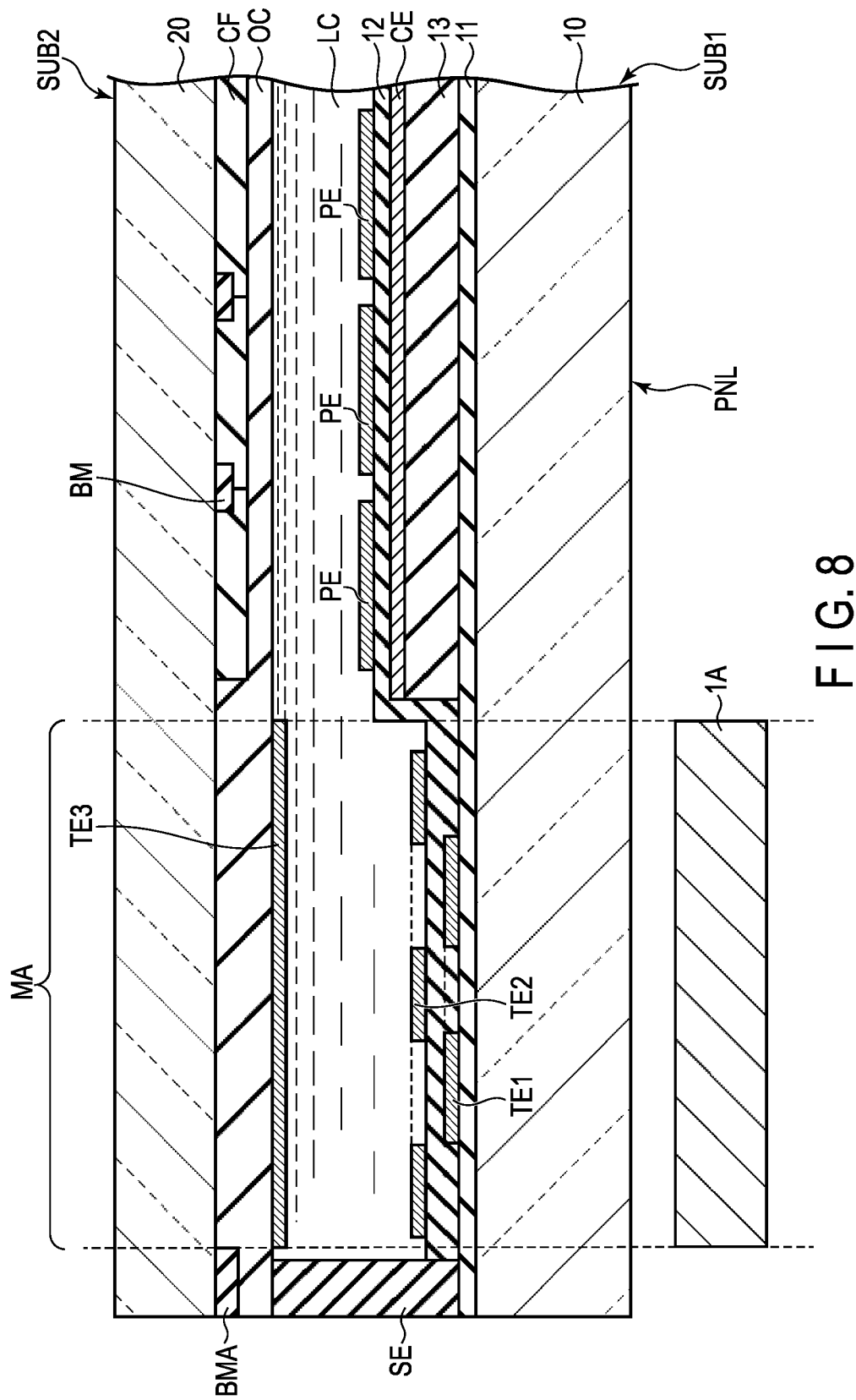
FIG. 8 is a cross-sectional view showing a structural example of a liquid crystal panel PNL.

FIG. 8 is a cross-sectional view showing a structural example of the liquid crystal panel PNL. The first substrate SUB1 comprises an insulating film 13 corresponding to the first organic insulating film. The insulating film 13 is disposed between the first insulating substrate 10 and the liquid crystal layer LC or between the first insulating substrate 10 and the common electrode CE. The common electrode CE is disposed between the insulating film 13 and the liquid crystal layer LC. The pixel electrode PE is disposed between the common electrode CE and the liquid crystal layer LC. The insulating film 12 is disposed between the pixel electrode PE and the common electrode CE. The illustrations of the alignment films are omitted in the first substrate SUB1 and the second substrate SUB2.

In the second substrate SUB2, the light-shielding layer BMA overlapping the sealant SE is formed integrally with the light-shielding layer BM between the color filters. However, no light-shielding layer or color filter is disposed in a region overlapping the projection element 1A. In addition, no light-shielding layer or color filter is disposed in a region overlapping the unillustrated detection element 1B and the unillustrated camera 1C.

The insulating film 13 is not disposed between the first insulating substrate 10 and the first transparent electrode TE1 or between the first insulating substrate 10 and the second transparent electrode TE2. Therefore, the liquid crystal layer LC overlapping the first transparent electrode TE1 and the liquid crystal layer LC overlapping the second transparent electrode TE2 are thicker than the liquid crystal layer LC overlapping the pixel electrode PE. The retardation of the liquid crystal layer LC is proportional to the thickness of the liquid crystal layer LC. Therefore, when the modulation area MA is in the on state, a larger retardation difference can be obtained between the first area MA1 and the second area MA2. In other words, the diffraction effect on the transmitted infrared light IR can be controlled by adjusting the thickness of the liquid crystal layer LC in the modulation area MA. It should be noted that the insulating film 13 may have a concave portion between the first insulating substrate 10 and the first transparent electrode TE1 and between the first insulating substrate 10 and the second transparent electrode TE2.

Figure 9:
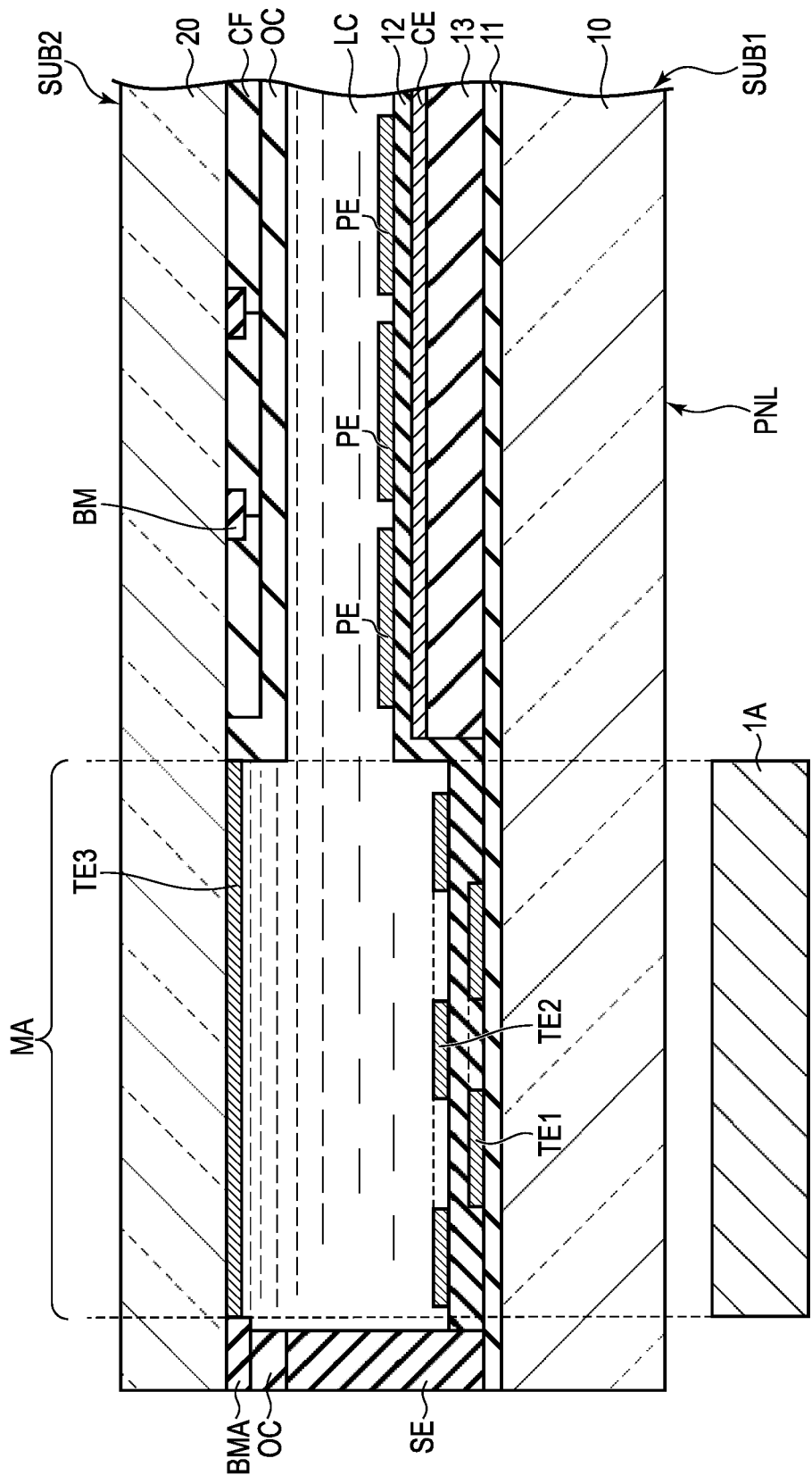
FIG. 9 is a cross-sectional view showing another structural example of the liquid crystal panel PNL.

FIG. 9 is a cross-sectional view showing another structural example of the liquid crystal panel PNL. The structural example shown in FIG. 9 is different from the structural example shown in FIG. 8 in that the transparent layer OC corresponding to the second organic insulating film is not disposed directly above the first transparent electrode TE1 or the second transparent electrode TE2. The third transparent electrode TE3 is disposed on the second insulating substrate 20.

According to this structural example, the liquid crystal layer LC overlapping the first transparent electrode TE1 and the liquid crystal layer LC overlapping the second transparent electrode TE2 are even thicker than those of the structural example shown in FIG. 8. Therefore, an even larger retardation difference can be obtained. In other words, the margin of the adjustable thickness can be expanded in the liquid crystal layer LC. It should be noted that the transparent layer OC may have a concave portion directly above the first transparent electrode TE1 and the second transparent electrode TE2.

FIG. 10 is a cross-sectional view showing the second configuration example of the liquid crystal element LCD including the modulation area MA shown in FIG. 2. The second configuration example shown in FIG. 10 is different from the first configuration example shown in FIG. 5 in that the second substrate SUB2 does not comprise the third transparent electrode TE3. The configuration of the first substrate SUB1 in the modulation area MA is the same as the first configuration example. In the second substrate SUB2, the transparent layer OC is covered with the alignment film AL2. That is, in the modulation area MA, the first transparent electrode TE1 and the second transparent electrode TE2 overlap the projection element 1A. The modulation area MA is controlled by the driver DR.

In the off state, the driver DR does not apply voltage to the first transparent electrode TE1 or the second transparent electrode TE2 (or applies the same potential to all the transparent electrodes). Therefore, voltage is not applied to the liquid crystal layer LC, and the liquid crystal molecules LM contained in the liquid crystal layer LC are initially aligned in a predetermined direction between the alignment films AL1 and AL2. In the liquid crystal layer LC in the off state, the retardation directly above the first transparent electrode TE1 is equal to the retardation directly above the second transparent electrode TE2.

In the on state, the driver DR applies the first voltage V1 to the first transparent electrode TE1, and applies the second voltage V2 different from the first voltage V1 to the second transparent electrode TE2. In this case, an electric field (fringe electric field) spreading over the liquid crystal layer LC is formed between the second transparent electrode TE1 and the second transparent electrode TE2. The liquid crystal molecules affected by the fringe electric field are aligned in a direction different from the initial alignment direction. Accordingly, as described with reference to FIGS. 6A and 6B, the liquid crystal layer LC forms the first area MA1 having the first retardation RT1 directly above the first transparent electrode TE1, and forms the second area MA2 having the second retardation RT2 different from the first retardation directly above the second transparent electrode TE2.

The same effects as those obtained in the first configuration example can also be obtained in the second configuration example.

Figure 11:
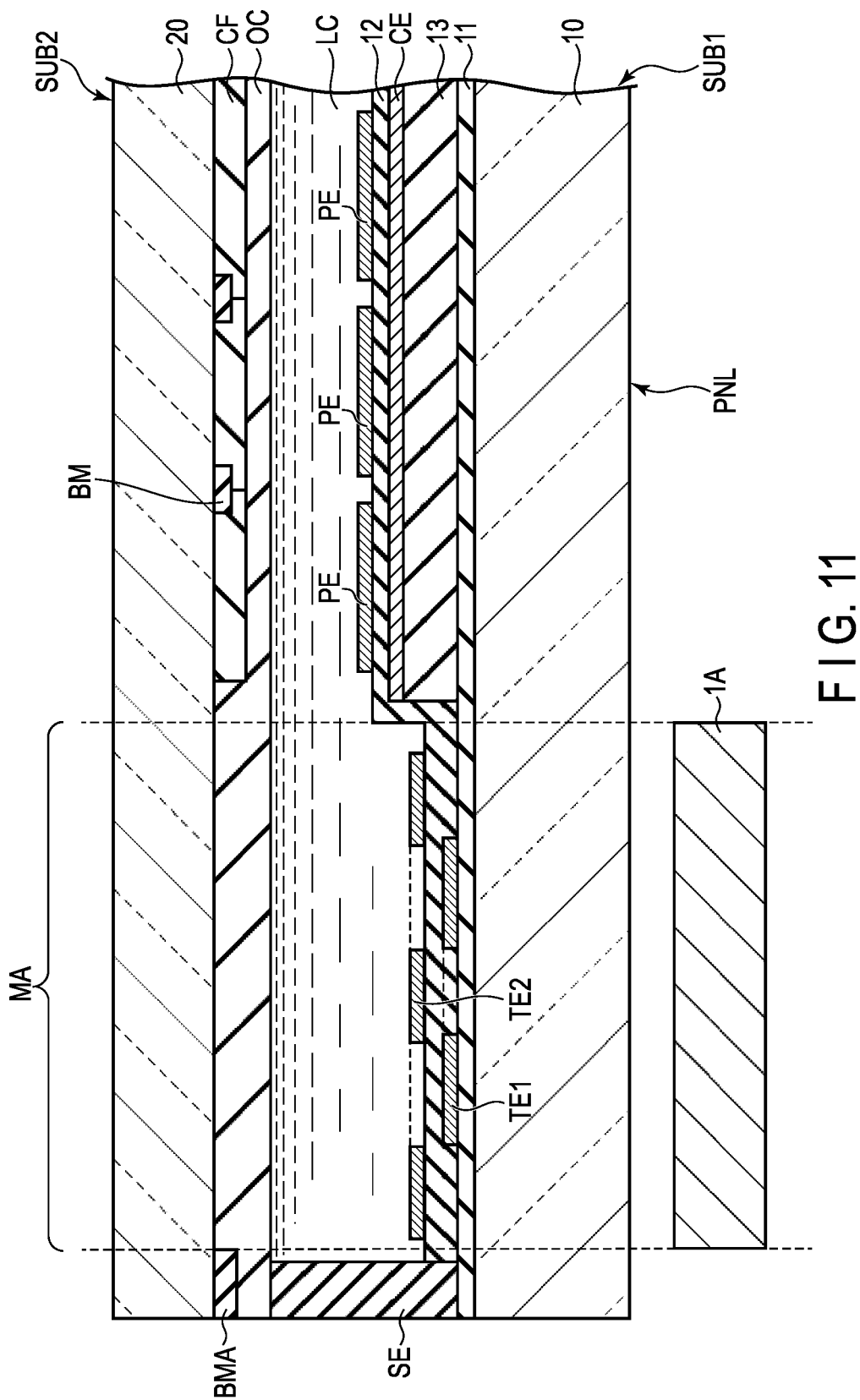
FIG. 11 is a cross-sectional view showing another structural example of the liquid crystal panel PNL.

FIG. 11 is a cross-sectional view showing another structural example of the liquid crystal panel PNL. The structural example shown in FIG. 11 is different from the structural example shown in FIG. 8 in that the third transparent electrode TE3 is not disposed directly above the first transparent electrode TE1 and the second transparent electrode TE2.

According to this structural example, the same effects as those obtained in the structural example shown in FIG. 8 can be obtained.

As described above, according to the present embodiment, a display device capable of expanding a display portion, and an electronic apparatus incorporating the display device can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a liquid crystal panel comprising a liquid crystal layer, a first transparent electrode, an insulating film covering the first transparent electrode, a second transparent electrode disposed between the insulating film and the liquid crystal layer, and a modulation area in which the first transparent electrode and the second transparent electrode are arranged alternately;
    a. projection element overlapping the liquid crystal panel, and projecting linearly polarized infrared light toward an object via the modulation area; and
    a detection element overlapping the liquid crystal panel, and detecting the infrared light reflected from the object via the liquid crystal panel.

2. The electronic apparatus of claim 1, wherein
    the liquid crystal panel comprises a third transparent electrode, and
    the liquid crystal layer is disposed between the first transparent electrode and the third transparent electrode and between the second transparent electrode and the third transparent electrode.

3. The electronic apparatus of claim 1, further comprising a driver, wherein
    the driver applies a first voltage to the first transparent electrode, and applies a second voltage different from the first voltage to the second transparent electrode, and
    a first area having a first retardation and a second area having a second retardation different from the first retardation are formed alternately in the modulation area.

4. The electronic apparatus of claim 1, wherein
    the liquid crystal panel further comprises:
    a first insulating substrate;
    a common electrode disposed between the first insulating substrate and the liquid crystal layer, and covered with the insulating film; and
    a pixel electrode disposed between the common electrode and the liquid crystal layer,
    the common electrode is located in a same layer as the first transparent electrode, and is formed of a same material as the first transparent electrode, and
    the pixel electrode is located in a same layer as the second transparent electrode, and is formed of a same material as the second transparent electrode.

5. The electronic apparatus of claim 4, wherein
the liquid crystal panel further comprises a first organic insulating film disposed between the first insulating substrate and the common electrode, and
the first organic insulating film is not disposed between the first insulating substrate and the first transparent electrode or between the first insulating substrate and the second transparent electrode.

6. The electronic apparatus of claim 5, wherein the pixel electrode and the common electrode do not overlap the projection element or the detection element.

7. The electronic apparatus of claim 5, wherein
the liquid crystal panel further comprises:
a second insulating substrate; and
a second organic insulating film disposed between the second insulating substrate and the liquid crystal layer, directly above the pixel electrode, and
the second organic insulating film is not disposed directly above the first transparent electrode or the second transparent electrode.

8. The electronic apparatus of claim 7, wherein the second organic insulating film is a color filter layer.

9. The electronic apparatus of claim 7, wherein the second organic insulating film is a transparent layer.

10. The electronic apparatus of claim 5, wherein the liquid crystal layer overlapping the first transparent electrode and the liquid crystal layer overlapping the second transparent electrode are thicker than the liquid crystal layer overlapping the pixel electrode.

11. The electronic apparatus of claim 1, wherein
the liquid crystal panel further comprises a sealant sealing in the liquid crystal layer, and
the detection element and the projection element are disposed inside the sealant in planar view.

12. The electronic apparatus of claim 11, wherein
the liquid crystal panel comprises a light-shielding layer overlapping the sealant, and
the light-shielding layer is not disposed directly above the first transparent electrode or the second transparent electrode.

13. The electronic apparatus of claim 1, further comprising an illumination device illuminating the liquid crystal panel, wherein
the illumination device has an opening, and
the detection element and the projection element overlap the opening.

14. The electronic apparatus of claim 13, wherein
the illumination device comprises a reflective sheet, a light guide disposed between the reflective sheet and the liquid crystal panel, and an optical sheet disposed between the light guide and the liquid crystal panel,
the light guide has a first opening,
the optical sheet has a second opening overlapping the first opening,
the reflective sheet has a third opening overlapping the first opening, and
the detection element and the projection element overlap the first to third openings.

15. A display device comprising:
a first substrate comprising a first insulating substrate, a first transparent electrode and a second transparent electrode disposed on the first insulating substrate, a common electrode and a pixel electrode disposed on the first insulating substrate, and an insulating film disposed between the first transparent electrode and the second transparent electrode and between the common electrode and the pixel electrode;
a second substrate comprising a second insulating substrate; and
a liquid crystal layer disposed between the first substrate and the second substrate, wherein
the liquid crystal layer forms a diffraction element overlapping the first transparent electrode and the second transparent electrode,
the first substrate further comprises a first organic insulating film disposed between the first insulating substrate and the common electrode,
the first organic insulating film is not disposed between the first insulating substrate and the first transparent electrode or between the first insulating substrate and the second transparent electrode, and
the liquid crystal layer overlapping the first transparent electrode and the liquid crystal layer overlapping the second transparent electrode are thicker than the liquid crystal layer overlapping the pixel electrode.

16. The display device of claim 15, wherein
the second substrate further comprises a third transparent electrode disposed between the second insulating substrate and the liquid crystal layer, and
the liquid crystal layer is disposed between the first transparent electrode and the third transparent electrode and between the second transparent electrode and the third transparent electrode.

17. The display device of claim 15, wherein
the second substrate further comprises a second organic insulating film between the second insulating substrate and the liquid crystal layer, and
the second organic insulating film is not disposed directly above the first transparent electrode or the second transparent electrode.

18. The display device of claim 15, further comprising an illumination device disposed on a back surface side of the first substrate, wherein
the illumination device has an opening, and
the opening overlaps a display portion for displaying an image in planar view.

* * * * *